US009877255B2

(12) United States Patent
Sasaki

(10) Patent No.: US 9,877,255 B2
(45) Date of Patent: Jan. 23, 2018

(54) BASE STATION, TERMINAL, WIRELESS COMMUNICATION SYSTEM AND COMMUNICATION METHOD

(71) Applicant: NEC Corporation, Tokyo (JP)

(72) Inventor: Takahiro Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 14/401,448

(22) PCT Filed: Mar. 7, 2013

(86) PCT No.: PCT/JP2013/056241
§ 371 (c)(1),
(2) Date: Nov. 14, 2014

(87) PCT Pub. No.: WO2013/172073
PCT Pub. Date: Nov. 21, 2013

(65) Prior Publication Data
US 2015/0181496 A1 Jun. 25, 2015

(30) Foreign Application Priority Data

May 17, 2012 (JP) ................................ 2012-113422

(51) Int. Cl.
*H04W 36/30* (2009.01)
*H04W 16/02* (2009.01)
(Continued)

(52) U.S. Cl.
CPC .......... *H04W 36/30* (2013.01); *H04W 16/02* (2013.01); *H04W 36/04* (2013.01); *H04W 72/04* (2013.01); *H04L 5/00* (2013.01)

(58) Field of Classification Search
CPC ....... H04W 4/00; H04W 24/00; H04W 24/02; H04W 84/045; H04W 36/00;
(Continued)

(56) References Cited

U.S. PATENT DOCUMENTS

2013/0244664 A1* 9/2013 Song ................. H04W 36/0083
455/437

FOREIGN PATENT DOCUMENTS

WO    WO 2013113144 A1 * 8/2013 .......... H04J 11/0023

OTHER PUBLICATIONS

3GPP TS 36.300 V11.1.10 (Mar. 2012), Evolved Universal Terrestrial Radio Access (E-UTRA) and Evolved Universal Terrestrial Radio Access Network (E-UTRA); Overall description; Stage 2.(Release 11), Excerpt pp. 116, 117, & 157, (5 pages).

(Continued)

*Primary Examiner* — Faruk Hamza
*Assistant Examiner* — Aixa Guadalupe-Cruz
(74) *Attorney, Agent, or Firm* — Wilmer Cutler Pickering Hale & Dorr

(57) ABSTRACT

In a wireless communication system including one or more second base station placed in a cell of a first base station which can be configured with ABS, a base station according to the present invention is applied as either the first base station or the second base station. The base station includes a communication portion that notifies a terminal which is communicating of offset values, each of which is applied to a reception quality regarding each cell of the first base station and the second station in a determination on whether to trigger an event regarding a handover operation, and which is a corrected offset value based on a ratio of ABS relative to entire subframes in the first base station.

13 Claims, 5 Drawing Sheets

(51) Int. Cl.
*H04W 36/04* (2009.01)
*H04W 72/04* (2009.01)
*H04L 5/00* (2006.01)

(58) Field of Classification Search
CPC . H04W 36/0083; H04W 36/04; H04W 36/30; H04W 92/20; H04W 36/22; H04W 28/08; H04W 16/02; H04W 72/04
See application file for complete search history.

(56) References Cited

OTHER PUBLICATIONS

3GPP TS 36.331, V10.5.0 (Mar. 2012), Evolved Universal Terrestrial Radio Access (E-UTRA); Radio Resource Control (RRC); Protocol specification.(Release 10), Excerpt p. 85, (3 pages).
Huawei, HiSilicon, Idle Mode Use Case and Handling on eICIC, 3GPP TSG-RAN WG2 Meeting #72 R2-106280, Nov. 15, 2010, 4 pages.
International Search Report corresponding to PCT/JP2013/056241, dated Apr. 23, 2013, 1 page.
3GPP, "UMTS Inbound Mobility Cell Individual Offset options," Alcatel-Lucent, 3GPP TSG-RAN WG2 Meeting #67bis, R2-096098, Agenda item 10.3.2, Miyazaki, Japan, 2 pages (Oct. 12-16, 2009).
Japanese Office Action issued by the Japan Patent Office for Japanese Application No. 2014-515519 dated Feb. 2, 2016 (5 pages).

\* cited by examiner

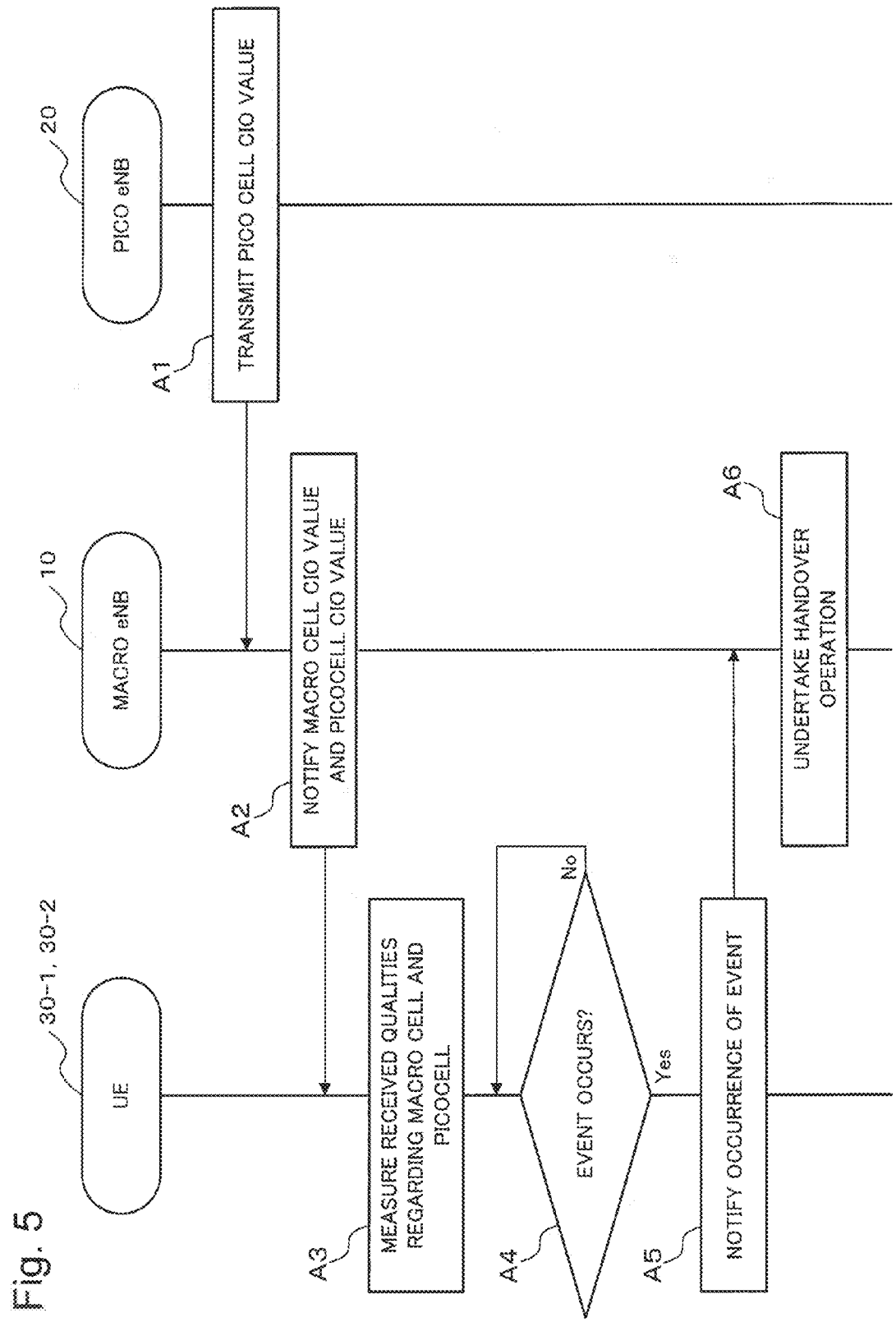

BASE STATION, TERMINAL, WIRELESS COMMUNICATION SYSTEM AND COMMUNICATION METHOD

CROSS-REFERENCE TO RELATED APPLICATIONS

This application is a national stage application of International Application No. PCT/JP2013/056241 entitled "BASE STATION, TERMINAL, WIRELESS COMMUNICATION SYSTEM AND COMMUNICATION METHOD" filed on Mar. 7, 2013, which claims priority to Japanese Application No. 2012-113422 filed on May 17, 2012, the disclosures of which are hereby incorporated by reference in their entirety.

TECHNICAL FIELD

The present invention relates to a base station, a terminal, a wireless communication system and a communication method.

BACKGROUND ART

Recently, mobile communication systems have been facing explosive increase of downlink data traffic. In order to cope with this situation, for LTE (long term evolution) based wireless communication systems, it is considered to introduce a heterogeneous network where, as shown in FIG. 1, within a coverage of a macro cell served by a Macro-eNB 10 (a first base station), a Pico-eNB 20 (a second base station) whose transmission power is smaller than that of the Macro-eNB 10 is placed and forms cell of smaller size.

In such a cell deployment, when carrier frequencies of the macro cell are the same as those of the pico cell, interference from the macro cell to the pico cell is an issue. To cope with this issue, in LTE-Advanced (3GPP LTE Release-10), in order to reduce the inter-cell interference at the same carrier frequencies, which arises between the macro cell and the pico cell placed within the macro cell, ABS (Almost Blank Subframe) has been introduced (refer to NPL 1).

ABS means a subframe for curtailing or reducing the interference from the macro cell to the pico cell. This is achieved by, for example, the Macro-eNB 10 not to transmit any piece of user data on ABS. The interference influenced on the pico cell can be reduced on a time division basis by setting some of subframes to ABS at regular intervals in the macro cell.

Meanwhile, in FIG. 1, each of the UEs (User Equipment: terminal) 30-1 and 30-2 measures a reception quality of a reference signal transmitted from each of the macro cell and the pico cell, and selects a serving cell. Such measurements of the reception qualities each regarding a corresponding one of the macro cell and the pico cell are called RRM measurements. In the LTE, each of the UEs 30-1 and 30-2 compares measured values of the reception qualities each regarding a corresponding one of the macro cell and the pico cell, and determines whether to trigger an event regarding a handover operation (for example, Event A3) on the basis of a result of the comparison. Further, upon occurrence of the event, each of the UEs 30-1 and 30-2 notifies the occurrence of the event to an eNB which is either the Macro-eNB 10 or the Pico-eNB 20 and with which each of the UEs 30-1 and 30-2 is communicating (refer to NPL 2). Upon reception of the notification for notifying the occurrence of the event from each of the UEs 30-1 and 30-2, the eNB, which is either the Macro-eNB 10 or the Pico-eNB 20, undertakes a handover operation for each of the UEs 30-1 and 30-2 on the basis of the event. In this case, the boundary between the pico cell and the macro cell is determined in accordance with the position where the event on handover operation occurs, and the position where the event occurs can be controlled by offset values each applied to a corresponding one of RRM measurements. In the deployment of heterogeneous network, the boundary between the pico cell and the macro cell tends to shift towards a pico cell side due to the interference from the macro cell, so a range of the pico cell tends to become smaller. To solve this, it is possible to adjust (broaden) the range of the pico cell to a proper one by appropriately selecting the above-described offset values.

In the case of the LTE, the reception quality measured for RRM measurements corresponds to RSRP (Reference Signal Received Power) which is a received-power level of the reference signal, or RSRQ (Reference Signal Received Quality) which is a reception quality of the reference signal.

CITATION LIST

Non Patent Literature

[NPL 1] 3GPP TS 36.300, V11.1.0 (2012-03)
[NPL 2] 3GPP TS 36.331, V10.5.0 (2012-03)

SUMMARY OF INVENTION

Technical Problem

In the heterogeneous network, in non-ABS of the macro cell, RRM measurement of the pico cell is largely influenced by the interference from the macro cell (nevertheless, to the same degree as in the case where any one of ABS are not set); while the interference from the macro cell is small in ABS of the macro cell.

This means that RRM measurement of the pico cell by the UE is influenced by configuration of ABS. Further, this leads to a problem that the boundary between the macro cell and the pico cell based on offset values set before the introduction of ABS, shifts by configuring ABS. Moreover, it is foreseen that the configuration of ABS is flexibly changed to some extent, for example, so as to be adapted to a traffic change, and this leads to a problem that this flexible change of configuration of ABS influences RRM measurements, thereby causing the cell boundary to vary.

Besides, there exists another problem because of the coexistence of the UEs which can be configured with subframes in which it performs RRM measurement and UEs which cannot RRM measurement For example, in the case where a measurement function which can be configured with subframes in which it performs RRM measurement is implemented in the UE 30-1, it is possible for network to cause the UE 30-1 to perform RRM measurement of the pico cell on the non-ABS of the macro cell which has been configured by the network as subframes for RRM measurement of the pico cell.

In contrast, in the case of the UE 30-2 in which such a measurement function is not implemented, it is impossible for the network to configure subframes for RRM measurement of the pico cell. As a result, the UE 30-2 performs RRM measurement for the pico cell in all subframes of the pico cell.

For this reason, although the UE 30-1 and the UE 30-2 are existing at almost the same location, there arises an event in which one of them notifies the occurrence of an event regarding a handover operation and the other one does not notify the occurrence of such an event, so cell boundary for UE 30-1 and cell boundary for UE 30-2 can be different.

As described above, in a related wireless communication system, in the case where ABS are set in the macro cell, there arises a problem that a position determined by each UE regarding a cell boundary between the macro cell and the pico cell varies depending on configuration of ABS, as well as a problem that there occurs a situation where a cell boundary for a UE and a cell boundary for another UE can be different because of difference of measurement function between these UEs.

Thus, an object of the present invention is to provide a base station, a terminal, a wireless communication system and a communication method which can solve the aforementioned problems.

Solution to Problem

A base station according to the present invention is a base station that, in a wireless communication system including one or more second base station placed in a cell of a first base station which can be configured with ABS, is applied as the first base station or the second base station, and the base station includes a communication portion that notifies a terminal which is communicating of offset values, each of which is applied to a reception quality regarding each cell of the first base station and the second station in a determination whether to trigger an event regarding handover operation, and which is a corrected offset value based on a ratio of ABS relative to entire subframes of the first base station.

A terminal according to the present invention is a terminal that, in a wireless communication system including one or more second base station placed in a cell of a first base station which can be configured with ABS, communicates with the first base station or the second base station, and the terminal includes a communication portion that receives, from a base station in communication which is either the first base station or the second base station, offset values, each of which is applied to a reception quality regarding each cell of the first base station and the second station in a determination whether to trigger an event regarding a handover operation, and which is a corrected offset value based on a ratio of ABS to entire subframes in the first base station, and a control unit that makes the determination on whether to trigger an event regarding a handover operation on the basis of the offset values received by the communication unit.

A wireless communication system according to the present invention is a wireless communication system including one or more second base station that is placed within a cell of a first base station which can be configured with ABS; and a base station which is either the first base station or the second base station notifies a terminal which is communicating of offset values, each of which is applied to a reception quality regarding a corresponding one of the cell of the first base station and a cell of the one of the at least a second station in a determination whether to trigger an event regarding a handover operation, and which is a corrected offset value based on a ratio of ABS to entire subframes in the first base station, and the terminal makes the determination whether to trigger an event regarding a handover operation on the basis of the offset values notified from the base station which is either the first base station or the second base station.

A communication method according to the present invention is a communication method for a base station that, in a wireless communication system including one or more second base station placed in a cell of a first base station which can be configured with ABS, is applied as the first base station or the second base station, and the communication method includes notifying a terminal which is communicating of offset values, each of which is applied to a reception quality regarding each cell of the first base station and the second station in a determination whether to trigger an event regarding a handover operation, and which is a corrected offset value based on a ratio of ABS to entire subframes of the first base station.

Advantageous Effects of Invention

According to the present invention, a base station notifies a terminal communicating with the base station of offset values, each of which is applied to a measurement of a reception quality regarding each cell of a first base station and the second station in a determination whether to trigger an event for a handover operation, and at least one of which is a corrected offset value based on a ratio of ABS to entire subframes of the first base station.

Thus, it is possible to mitigate the presence or absence of a configuration of ABS, a ratio of ABS, and a difference of the measured value of the reception quality of RRM measurement among terminals.

This brings about an advantageous effect of making it possible to prevent problem that a position of cell boundary between the macro cell and the pico cell varies depending on configuration of ABS, as well as a problem which cell-boundary could be different due to difference of measurement-function difference among UEs.

BRIEF DESCRIPTION OF DRAWINGS

FIG. 5 is a sequence diagram for describing the whole operation of a wireless communication system according to this exemplary embodiment.

DESCRIPTION OF EMBODIMENTS

Hereinafter, an exemplary embodiment to embody the present invention will be described with reference to the drawings.

Figure 1:
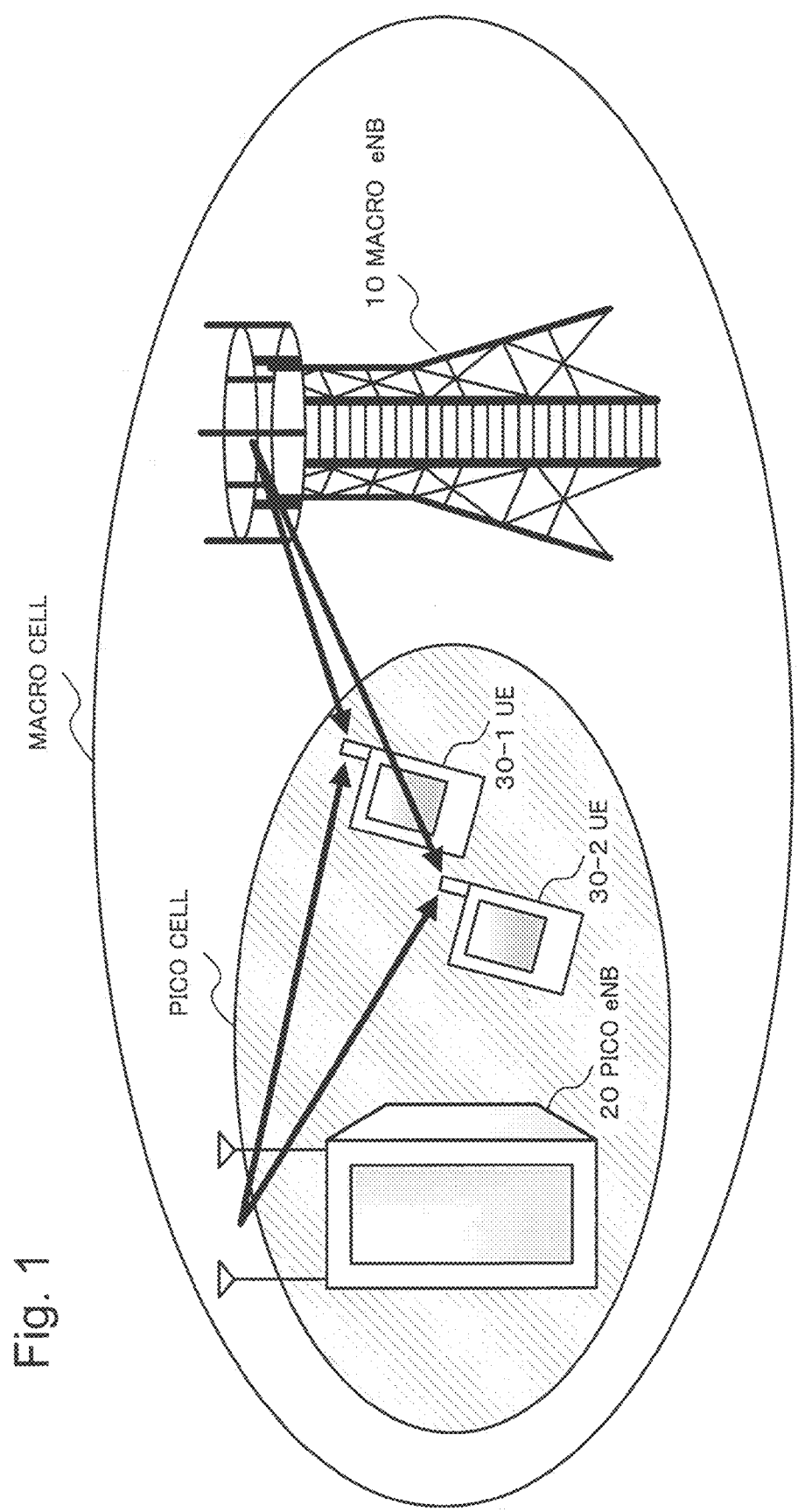
FIG. 1 is a diagram illustrating an example of a LTE/LTE-Advanced wireless communication system.

In a wireless communication system of this exemplary embodiment, a cell placement is supposed to be one shown in FIG. 1.

As described above, each of the UEs 30-1 and 30-2 performs RRM measurements each for measuring the reception quality of the macro cell and the pico cell; compares measured values of the reception qualities of the macro cell and the pico cell; and determines whether to trigger an event for a handover operation on the basis of a result of the comparison. Further, upon occurrence of the event, each of the UEs 30-1 and 30-2 notifies the occurrence of the event to an eNB in communication which is either the Macro-eNB 10 or the Pico-eNB 20.

Nevertheless, in the case where the macro cell is configured with ABS, there exists a problem that a cell boundary between the macro cell and the pico cell varies depending on the presence or absence of a configuration of ABS and a ratio of ABS, as well as a problem that each cell boundary can be different because of difference of the measured value of reception quality due to difference of the measurement function of the UE.

Thus, in this exemplary embodiment, in order to absorb the presence or absence of a configuration of ABS, a ratio of ABS, and a difference of RRM measurement values between the UE 30-1 and the UE30-2, each of the Pico-eNB 20 and the Macro-eNB 10 corrects CIO (Cell Individual Offset) values which are offset values each being applied to a measurement of a reception quality of each cell in a determination by each of the UEs 30-1 and 30-2 whether to trigger an event regarding a handover operation.

Hereinafter, a configuration of each of the Pico-eNB 20, the Macro-eNB 10 and the UE 30 will be described.

Figure 2:
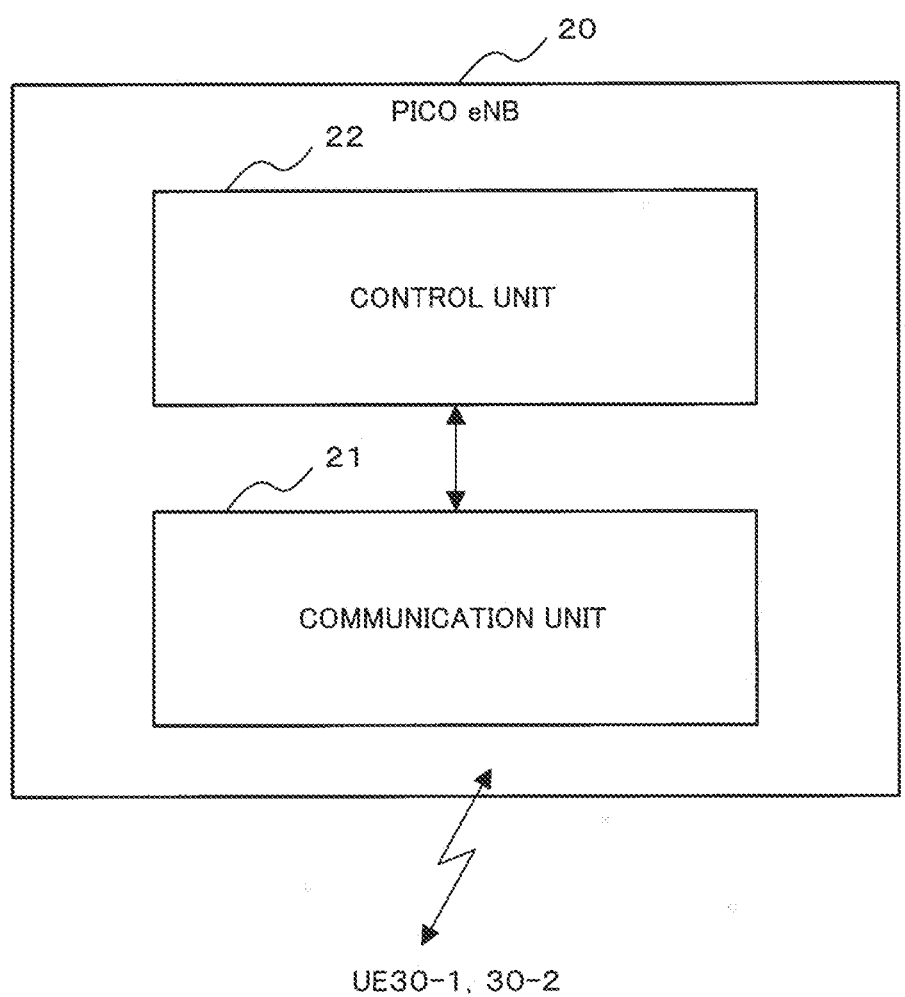
FIG. 2 is a block diagram illustrating a configuration of a Pico-eNB 20 according to this exemplary embodiment.

As shown in FIG. 2, the Pico-eNB 20 includes a communication unit 21 and a control unit 22.

The communication unit 21 performs wireless communication with each of the UEs 30-1 and 30-2.

For example, the communication unit 21 notifies CIO value for the pico cell and CIO value for the macro cell to each of the UEs 30-1 and 30-2 which is communicating.

The control unit 22 corrects at least CIO value of the pico cell to be notified to the UE 30-2 which is not equipped with measurement function which can be configured with subframes in which it performs RRM measurement, on the basis of a ratio of ABS relative to entire subframes in the Macro-eNB 10.

Further, when the communication unit 21 has received a notification of the occurrence of an event (Event A3) from each of the UEs 30-1 and 30-2 which is communicating, the control unit 22 undertakes a handover operation for each of the UEs 30-1 and 30-2.

Figure 3:
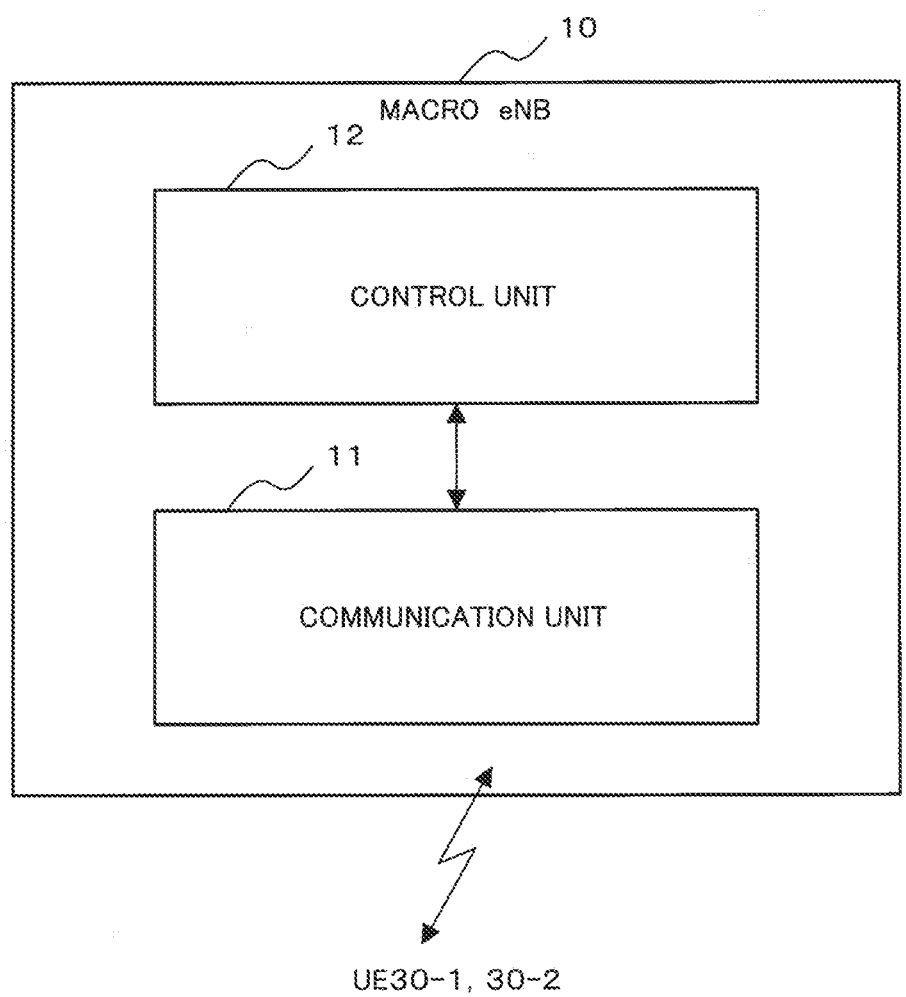
FIG. 3 is a block diagram illustrating a configuration of a Macro-eNB 10 according to this exemplary embodiment.

As shown in FIG. 3, the Macro-eNB 10 includes a communication unit 11 and a control unit 12.

The communication unit 11 performs wireless communication with each of the UEs 30-1 and 30-2.

For example, the communication unit 11 notifies CIO value for the pico cell and CIO value for the macro cell to each of the UEs 30-1 and 30-2 which is communicating.

The control unit 12 corrects at least CIO value for the macro cell to be notified to the UE 30-2, in which the above-described measurement function is not implemented, on the basis of a ratio of ABS relative to entire subframes in the Macro-eNB 10.

Further, when the communication unit 11 has received a notification of the occurrence of an event (Event A3) from each of the UEs 30-1 and 30-2 which is communicating, the control unit 12 undertakes a handover operation for each of the UEs 30-1 and 30-2.

In addition, although not illustrated in FIGS. 2 and 3, it is supposed that the Pico-eNB 20 and the Macro-eNB 10 are connected to each other so as to allow the communication unit 21 and the communication unit 11 to communicate with each other.

For example, as a method of allowing the Pico-eNB 20 and the Macro-eNB 10 to be connected to each other, there can be considered a method of connecting the Pico-eNB 20 and the Macro-eNB 10 to an O&M (Operation & Maintenance) server, or a method of connecting the Pico-eNB 20 and the Macro-eNB 10 via a X2 interface.

Thus, the communication unit 21 of the Pico-eNB 20 can obtain information related to the ratio of ABS relative to entire subframes in the Macro-eNB 10, and the like, from the Macro-eNB 10 by the base station communication via the X2 interface, or by a control console via the O & M server.

Figure 4:
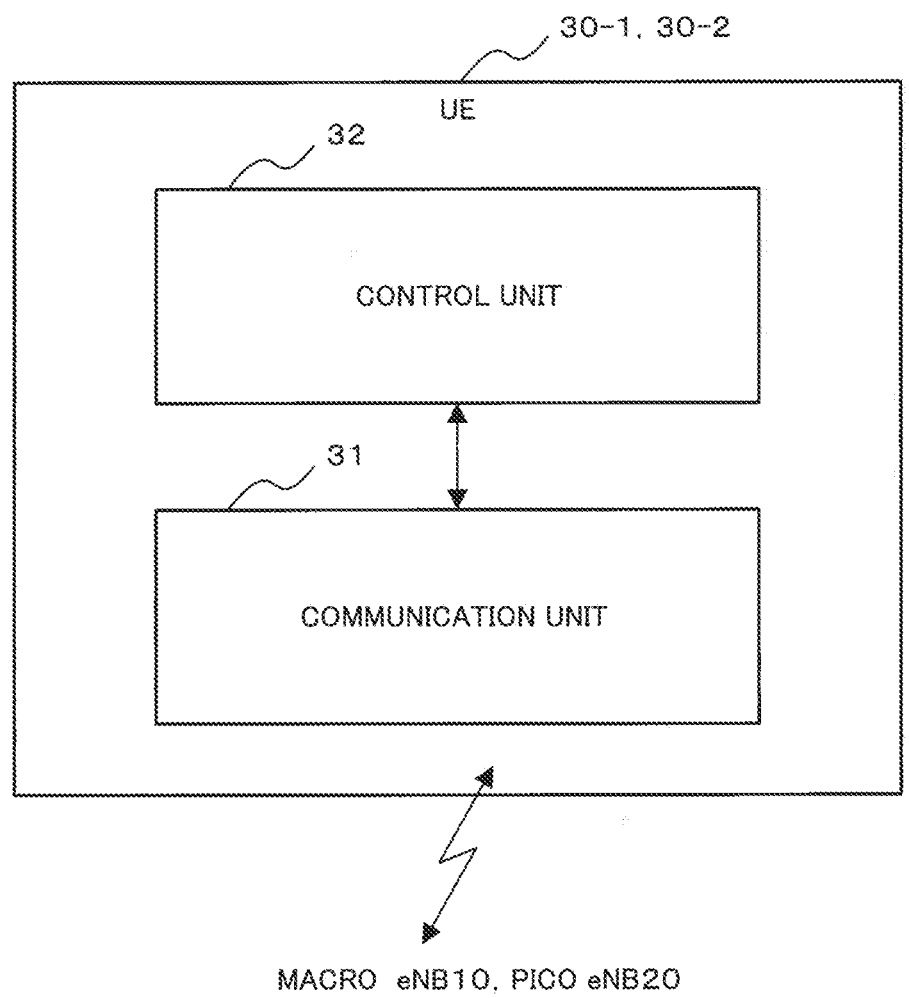
FIG. 4 is a block diagram illustrating a configuration of UE 30-1, 30-2 according to this exemplary embodiment.

As shown in FIG. 4, each of the UEs 30-1 and 30-2 includes a communication unit 31 and a control unit 32.

The communication unit 31 performs wireless communication with either the Macro-eNB 10 or the Pico-eNB 20.

For example, the communication unit 31 receives CIO value for the macro cell and CIO value for the pico cell from an eNB in communication which is either the Macro-eNB 10 or the Pico-eNB 20.

The control unit 32 performs RRM measurements for measuring each received qualities of the macro cell and the pico cell.

Further, the control unit 32 corrects each of the measured values of reception qualities of the macro cell and the pico cell by using CIO value for the macro cell and CIO value for the pico cell; compares measured values resulting from the corrections; and determines whether to trigger an event (Event A3) regarding a handover operation on the basis of a result of the comparison.

Upon occurrence of the event regarding a handover operation, the communication unit 31 notifies the occurrence of the event to an eNB in communication which is either the Macro-eNB 10 or the Pico-eNB 20.

Hereinafter, the whole operation of a wireless communication system of this exemplary embodiment will be described with reference to FIG. 5. Here, it is supposed that both of the UEs 30-1 and 30-2 are communicating with the Macro-eNB 10.

As shown in FIG. 5, the communication unit 21 of the Pico-eNB 20 transmits CIO values for the pico cell each to be notified to a corresponding one of the UEs 30-1 and 30-2 to the Macro-eNB 10 via the X2 interface (step A1). In this case, the control unit 22 of the Pico-eNB 20 makes a correction of CIO value for the pico cell to be notified to the UE 30-2 on the basis of a ratio of ABS relative to entire subframes in the Macro-eNB 10.

The communication unit 11 of the Macro-eNB 10 notifies each of the UEs 30-1 and 30-2 of CIO value for the pico cell having been transmitted from the Pico-eNB 20, together with CIO value for the macro cell (step A2). In this case, the control unit 12 of the Macro-eNB 10 makes a correction of CIO value for the macro cell to be notified to the UE 30-2 on the basis of the ratio of ABS relative to entire subframes in the Macro-eNB 10.

The control unit 32 of each of the UEs 30-1 and 30-2 performs RRM measurements each for measuring a reception quality regarding the macro cell and the pico cell (step A3).

Next, the control unit 32 of each of the UEs 30-1 and 30-2 corrects each of the measured values of reception qualities of the macro cell and the pico cell by using CIO value for the macro cell and CIO value for the pico cell; compares measured values resulting from the corrections; and determines whether to trigger an event (Event A3) regarding a handover operation on the basis of a result of the comparison (step A4).

Upon occurrence of the event regarding a handover operation in step A4, the communication unit 31 of each of the UEs 30-1 and 30-2 notifies the occurrence of the event to the Macro-eNB 10 which is communicating (step A5).

When the communication unit 11 has received the notification of the occurrence of the event from each of the UEs 30-1 and 30-2, the control unit 12 of the Macro-eNB 10 undertakes a handover (step A6).

Subsequent operations have no relation with the present invention, and thus, description thereof is omitted here.

Here, a specific example of the process performed by the Pico-eNB 20 in step A1 will be described.

Here, with respect to the UE 30-1 in which a measurement function which can be configured with subframes in which it performs RRM measurement is implemented, it is supposed that a subframe which is included in subframes of the macro cell and is not configured as ABS is designated, as a subframe for use in RRM measurement of the pico cell, from the network. Thus, the UE 30-1 performs RRM measurement of the pico cell at a subframe of the pico cell corresponding to the subframe which is not configured as ABS of the macro cell.

In this case, the control unit 22 of the Pico-eNB 20 causes CIO value for the pico cell to be notified to the UE 30-1 to become the same as CIO value (hereinafter, this CIO value being referred to as O_Cnon-ABS) which is applied when any one of ABS is not set.

In contrast, with respect to the UE 30-2 in which the above-described measurement function is not implemented, a subframe on which RRM measurement of the pico cell is performed cannot be designated from the network. For this reason, the UE 30-2 performs RRM measurement of the pico cell at all subframes of the pico cell.

In this case, when the same CIO value for the pico cell as that for the UE 30-1 is notified to the UE, although the UEs 30-1 and 30-2 are existing at almost the same location, there occurs a difference between the UEs 30-1 and 30-2 in a measured value of a reception quality regarding the pico cell, so a cell boundary for UE 30-1 and a cell boundary for the UE 30-2 can be different.

Thus, the control unit 22 of the Pico-eNB 20 corrects CIO value for the pico cell to be notified to the UE 30-2 (hereinafter, this CIO value for the pico cell being referred to as O_CALL) on the basis of a ratio of ABS relative to entire subframes in the Macro-eNB 10.

Specifically, for example, a ratio of ABS relative to entire subframes in the macro cell is denoted by "r", and further, a strength of interference given to the pico cell by the macro cell in ABS is denoted by "p" in the case where a strength of interference given to the pico cell by the macro cell when any one of ABS is not set in the macro cell or a strength of interference given to the pico cell by the macro cell in a subframe which is not configured as ABS is made "1". For example, "p" can be represented by a ratio of transmission power of the Macro-eNB 10 in ABS relative to transmission power of the Macro-eNB 10 in a subframe which is a non-ABS.

In this case, an average value of a strength of interference given to the pico cell from the macro cell in entire subframes can be represented by the following expression when a strength of the interference under a condition where any one of ABS is not set is made "1".

Average value of strength of interference: $r*p+(1-r)*1$

Here, the control unit 22 of the Pico-eNB 20 makes a correction value for use in the correction of O_CALL the following correction value.

Correction value: $10*\log 10(r*p+(1-r)*1)$ [dB]

Further, the control unit 22 of the Pico-eNB 20 corrects O_CALL to be notified to the UE 30-2 in accordance with the following formula (1) using the above-described correction value.

$$\text{O\_CALL} = \text{O\_Cnon-ABS} + 10*\log 10(r*p+(1-r)*1) \text{ [dB]} \quad (1)$$

The communication unit 21 of the Pico-eNB 20 notifies the Macro-eNB 10 of two kinds of CIO values for the pico cell (O_Cnon-ABS and O_CALL resulting from calculation using the formula (1)).

In addition, the Macro-eNB 10 selects, for each of the US 30-1 and US 30-2, an appropriate one of the two kinds of CIO values for the pico cell having been received from the Pico-eNB 20, in accordance with the function of each of the US 30-1 and US 30-2, and notifies each of the US 30-1 and US 30-2 of a selected one of the two kinds of CIO values for pico cell. For example, the Macro-eNB 10 notifies the US 30-1 of O_Cnon-ABS, and notifies the US 30-2 of O_CALL.

As described above, in this exemplary embodiment, each of the Pico-eNB 20 and the Macro-eNB 10 corrects CIO values, which are offset values each being applied to the reception quality of each cells in the determination by each of UEs on whether to trigger the event on the basis of a ratio of ABS relative to entire subframes in the Macro-eNB 10.

Consequently, it is possible to mitigate the presence or absence of a configuration of ABS, a ratio of ABS, and a difference of RRM measurement values between the UE 30-1 and the UE30-2, and thus, this brings about an advantageous effect of making it possible to prevent the occurrence of a problem that a cell boundary between the macro cell and the pico cell varies depending on configuration of ABS, as well as a problem that each cell boundary can be different due to the difference of the measurement function of the UE.

Hereinbefore, the present invention has been described with reference to an exemplary embodiment, but the present invention is not limited to the aforementioned exemplary embodiment. Various changes understandable for those skilled in the art can be made on the configuration and the details of the present invention within the scope of the present invention.

For example, in this exemplary embodiment, there is given an example in which each of the Macro-eNB 10 and the Pico-eNB 20 notifies a CIO value having been corrected by each station itself to another station. However, the present invention is not limited to this example. Each of the Macro-eNB 10 and the Pico-eNB 20 may correct by each station itself an uncorrected CIO value having been received from another station, or an O&M server may correct the uncorrected CIO values respectively, and may notify the corrected CIO values to each of the Macro-eNB 10 and the Pico-eNB 20.

In this exemplary embodiment, there is given an example which is applied to between the macro cells of the Macro-eNBs 10 and the pico cell of the Pico-eNB 20, which is placed between the macro cells. However, the present invention is not limited to this example, and the present invention is also applicable to between macro cells.

Further, in this exemplary embodiment, there is given an example in which only a single Pico-eNB 20 is placed within the macro cell of the Macro-eNB 10. However, the present invention is not limited to this example, and the present invention is also applicable to a wireless communication system in which a plurality of Pico-eNBs 20 is placed within the macro cell of the Macro-eNB 10.

This application is based upon and claims the benefit of priority from Japanese patent application No. 2012-113422, filed on May 17, 2012, the disclosure of which is incorporated herein in its entirety by reference.

The invention claimed is:

1. A base station comprising one of a first base station and a second base station , the base station comprising:
a controller configured to correct an offset value based on a ratio of an almost blank subframe (ABS) to entire subframes to produce a corrected offset value; and a transceiver configured to notify a terminal communicating with the base station of the corrected offset value, wherein the controller is configured to apply the corrected offset value to a reception quality regarding a cell of the base station to determine whether to trigger an event regarding a handover operation, and wherein the corrected offset value is an offset value corrected using a correction value based on the ratio of ABS relative to entire subframes in the first base station and a strength of interference given to the cell of the second base station by the cell of the first base station, wherein, when the ratio of ABS relative to entire subframes in the first base station is denoted by "r", and further, the strength of the interference given to the cell of the second base station by the cell of the first base station when ABS is set is denoted by "p" in the case where a strength of interference given to the cell of the second base station by the cell of the first base station when any one of ABS is not set is made "1", the corrected offset value is the offset value corrected using the correction value represented by "10*log10(r*p +(1−r)*1)".

2. The base station according to claim 1, wherein, in the case where the base station comprises the first base station, the transceiver receives a uncorrected offset value of the second base station from the second base station, and the controller corrects the uncorrected offset value of the first base station and the uncorrected offset value of the second base station.

3. The base station according to claim 1, wherein, in the case where the base station comprises the first base station, the transceiver receives a corrected offset value of the second base station from the second base station, and the controller corrects the uncorrected offset value of the first base station.

4. The base station according to claim 1, wherein, in the case where the base station comprises the second base station, the transceiver receives information related to the ratio of ABS to entire subframes in the first base station and a uncorrected offset value of the first base station from the first base station, and the controller corrects a uncorrected offset value of the second base station and the uncorrected offset value of the first base station.

5. The base station according to claim 1, wherein, in the case where the base station comprises the second base station, the transceiver receives information related to the ratio of ABS to entire subframes in the first base station and a corrected offset value of the first base station from the first base station, and the controller corrects the uncorrected offset value of the second base station.

6. The base station according to claim 1, wherein the transceiver receives, from a server, the corrected offset value of the first base station or the corrected offset value of the second base station.

7. The base station according to claim 1, wherein each of the offset values is a cell individual offset (CIO) value.

8. The base station according to the claim 1, wherein the controller performs a handover of user equipment based on a notification, received from the user equipment, of an occurrence of the event regarding the handover operation.

9. A terminal that is configured to communicate with a base station comprising one of a first base station and a second base station, the terminal comprising:

a transceiver configured to receive, from the base station, a corrected offset value, wherein the corrected offset value is applied to a reception quality regarding a cell of the base station, is configured to be used to determine whether to trigger an event regarding a handover operation, and is based on a ratio of an almost blank subframe (ABS) to entire subframes; and a controller configured to determine whether to trigger the event regarding the handover operation based on the corrected offset value, wherein the corrected offset value is an offset value corrected using a correction value based on the ratio of ABS relative to entire subframes in the first base station and a strength of interference given to the cell of the second base station by the cell of the first base station, wherein, when the ratio of ABS relative to entire subframes in the first base station is denoted by "r", and further, the strength of the interference given to the cell of the second base station by the cell of the first base station when ABS is set is denoted by "p" in the case where a strength of interference given to the cell of the second base station by the cell of the first base station when any one of ABS is not set is made "1", the corrected offset value is the offset value corrected using the correction value represented by "10*log10(r*p +(1−r)*1)".

10. The terminal according to claim 9, wherein each of the offset values is a cell individual offset (CIO) value.

11. The terminal according to the claim 9, wherein the controller performs a handover of user equipment based on a notification, received from the user equipment, of an occurrence of the event regarding the handover operation.

12. A communication method for a base station comprising one of a first base station and a second base station, the communication method comprising:

correcting an offset value based on a ratio of an almost blank subframe (ABS) to entire subframes to produce a corrected offset value; and notifying a terminal communicating with the base station of the corrected offset value, wherein the corrected offset value is applied to a reception quality regarding a cell of the base station to determine whether to trigger an event regarding a handover operation, wherein the corrected offset value is an offset value corrected using a correction value based on the ratio of ABS relative to entire subframes in the first base station and a strength of interference given to the cell of the second base station by the cell of the first base station, wherein, when the ratio of ABS relative to entire subframes in the first base station is denoted by "r", and further, the strength of the interference given to the cell of the second base station by the cell of the first base station when ABS is set is denoted by "p" in the case where a strength of interference given to the cell of the second base station by the cell of the first base station when any one of ABS is not set is made "1", the corrected offset value is the offset value corrected using the correction value represented by "10*log10(r*p +(1−r)*1)".

13. The communication method according to the claim 12, wherein the controller performs a handover of user equipment based on a notification, received from the user equipment, of an occurrence of the event regarding the handover operation.

* * * * *